United States Patent
Elbs et al.

(10) Patent No.: US 7,524,389 B2
(45) Date of Patent: Apr. 28, 2009

(54) PROCESS FOR PRODUCING A COMPOSITE BODY PART FOR A MOTOR VEHICLE

(75) Inventors: Norbert Elbs, Munich (DE); Manfred Hoeller, Munich (DE); Bernd Schleicher, Munich (DE); Thomas Stemmer, Munich (DE); Wolfgang Wagner, Munich (DE); Matthias Dichtl, Eurasburg (DE); Frank Kiesewetter, Germering (DE); Ralf Schwaighoffe, Neubeuern (DE)

(73) Assignee: Webasto AG, Stockdorf (DE)

( * ) Notice: Subject to any disclaimer, the term of this patent is extended or adjusted under 35 U.S.C. 154(b) by 561 days.

(21) Appl. No.: 11/116,213

(22) Filed: Apr. 28, 2005

(65) Prior Publication Data
US 2005/0242469 A1 Nov. 3, 2005

(30) Foreign Application Priority Data
Apr. 30, 2004 (DE) ........................ 10 2004 021 337

(51) Int. Cl.
*B29C 45/14* (2006.01)
(52) U.S. Cl. ........................ 156/242; 156/285; 264/275; 264/279
(58) Field of Classification Search ........................ None
See application file for complete search history.

(56) References Cited

U.S. PATENT DOCUMENTS

| 4,634,563 | A | * | 1/1987 | Hancock ..................... 264/46.7 |
| 4,923,539 | A | * | 5/1990 | Spengler et al. ............... 156/79 |
| 5,397,409 | A | * | 3/1995 | Kornylo ...................... 156/79 |
| 5,665,301 | A | * | 9/1997 | Alanko ....................... 264/571 |
| 6,299,819 | B1 | * | 10/2001 | Han ........................... 264/510 |
| 6,848,739 | B2 | | 2/2005 | Stallfort et al. |
| 2003/0057583 | A1 | * | 3/2003 | Whitehead et al. ......... 264/45.4 |
| 2004/0219244 | A1 | * | 11/2004 | Filsinger et al. ............ 425/116 |
| 2005/0001347 | A1 | * | 1/2005 | Kralik et al. ................ 264/161 |

* cited by examiner

*Primary Examiner*—Richard Crispino
*Assistant Examiner*—Barbara J. Musser
(74) *Attorney, Agent, or Firm*—David S. Safran; Roberts Mlotkowski Safran & Cole, P.C.

(57) ABSTRACT

A process and tool for producing a composite body part for a motor vehicle, especially for producing a roof module, the tool having a first tool part and a second tool part which are movable relative to one another. The outer skin is inserted in the first tool part, at least part of the peripheral edge area of the side of the outer skin facing the first tool part being moved into sealing contact with a seal arrangement which is provided on the first tool part, plastic material is applied to the side of the outer skin facing away from the first tool part, the second tool part provision shaping the plastic material, and the composite body part being released from the seal arrangement and removed from the tool.

14 Claims, 2 Drawing Sheets

PROCESS FOR PRODUCING A COMPOSITE BODY PART FOR A MOTOR VEHICLE

BACKGROUND OF THE INVENTION

1. Field of Invention

This invention relates to a process and a tool for producing a composite body part for a motor vehicle, especially for producing a roof module.

2. Description of Related Art

German Patent Application DE 101 63 709 A1 and corresponding U.S. Pat. No. 6,848,739 describe a roof module which can be placed with its outside edges on a body frame and can be securely connected to it. The roof module has an outer skin of steel sheet or a plastic film which on its inside is foamed on the back with a polyurethane-based foam plastic layer. In the middle section, the outer skin has an opening in which there is a transparent plate which in its peripheral edge area on the bottom is likewise foamed on the back with a foam plastic layer. Between the edge of the transparent plate and the edge of the opening in the outer skin a gap is formed which is foamed with the foam plastic, this taking place in such a way that the outer side of the roof module is flat in this area. The gap space is already filled in the foaming process, in the foaming mold its being necessary to provide for the gap space being bridged only with a smooth surface without overlapping by the foam plastic between the outer surfaces of the outer skin and the transparent plate. It is not mentioned how this requirement is to be taken into account.

SUMMARY OF THE INVENTION

The object of this invention is to devise a process and a tool for producing a composite body part for a motor vehicle, especially for producing a roof module, so that the body part has an outer skin and a plastic layer which is provided on the inside of the outer skin, the plastic layer extending beyond the edge of the outer skin, this being achieved in a manner so the plastic material is easily and reliably prevented from reaching the outer side of the outer skin to a noticeable extent.

This object is achieved in accordance with the invention by a tool having a first and a second tool part, which can be moved relative to one another, the first tool part being formed such that the outer skin can be inserted, and being provided with a seal arrangement so that at least one part of the peripheral edge area of the side of the outer skin facing the first tool part can be moved into sealing contact with the seal arrangement, the tool being provided with means to apply plastic material to the side of the outer skin facing away from the first tool part, and the second tool part being made to provide for shaping the plastic material. In this approach of the invention, it is advantageous that, because the outer skin in its peripheral edge area is moved into sealing contact with a seal arrangement which is provided on the first tool part, the penetration of plastic material into the area between the outer skin and the first tool part is reliably prevented even if, for example, for reasons of equalization of production tolerances and different coefficients of thermal expansion, the outer skin does not extend to the edge of the first tool part. In this way, the plastic layer extends beyond the edge of the outer skin, yet it is possible to reliably prevent the plastic material from migrating behind the outer skin and reaching the outer side of the outer skin.

In this way composite body components can be produced which are partially covered by the outer skin and partially exposed.

In particular, the necessity of cutting or reworking the edge area of the composite body part to an excess degree can also be avoided. In doing so, the material consumption can also be reduced. Furthermore, the freedom of configuration for feasible geometries of the composite body part is increased.

Preferably, at least in the partial area between the first tool part and the outer skin, a negative pressure is produced in order to cause sealing contact of the outer skin with the seal arrangement. This enables good and reliable sealing even when the geometry of the outer skin is problematic. Furthermore, the outer skin can be distinctly positioned in the tool by generating a negative pressure and also remains fixed there during the production process.

The invention is explained in detail below by way of example with reference to the accompanying drawings.

DETAILED DESCRIPTION OF THE INVENTION

Figure 1:
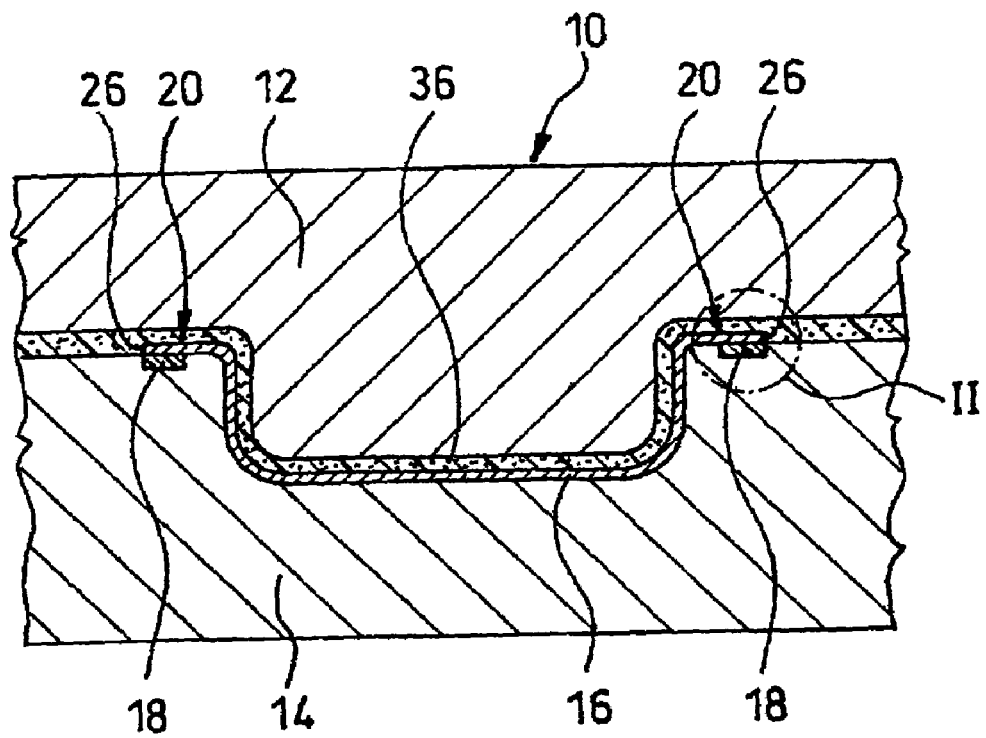
FIG. 1 is a cross-sectional view of the tool in accordance with the invention for producing a roof module in the closed state during the production process.

FIG. 1 shows an area of the tool 10 which comprises an upper tool 12 and a lower tool 14. The tool 10 can be opened and closed in the conventional manner by moving the upper tool 12 and the lower tool 14 relative to one another. FIG. 1 shows the tool in the closed state.

At the start of the production process for a composite-body part for a motor vehicle, especially for producing a roof module, an outer skin 16 which is formed, for example, from a plastic film or a metallic material, for example, an aluminum sheet or steel sheet, is preformed into the desired shape, for example, by means of a deep drawing process. Then, the preformed outer skin 16 is inserted into the opened tool 10, and in doing so, placed on the lower tool 14 such that the side of the outer skin, which later forms the outer side of the body part, points down.

The lower tool 14 is provided with a seal arrangement 18 against which at least one part of the peripheral edge area 20 of the outer side of the outer skin 16 is placed. The seal arrangement 18 can extend over part of the peripheral edge area 20 or over the entire peripheral edge area 20. In the case where the seal arrangement 18 extends around the entire peripheral edge area 20, then a closed curve is formed.

Figure 2:
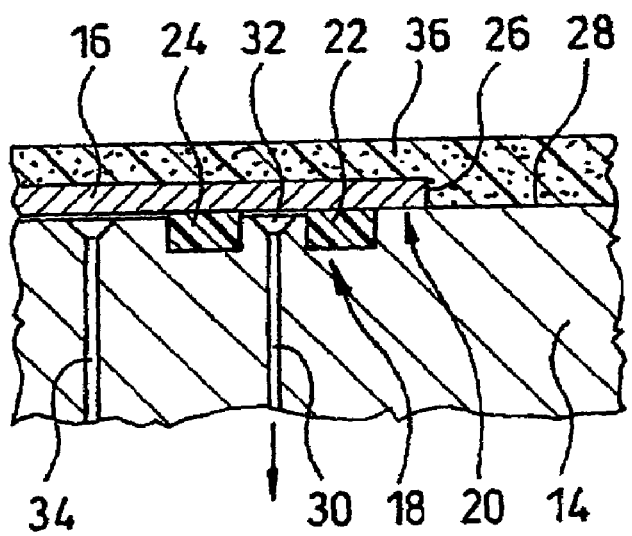
FIG. 2 is an enlarged view of the encircled area labeled II in FIG. 1.

As shown in FIG. 2, the seal arrangement 18 has two sealing lips 22, 24 which run essentially parallel and which are arranged offset one behind the other with respect to the edge 26 of the outer skin 16. The sealing lips 22, 24 are made of a permanently elastic material and are held in a recess in the surface 28 of the lower tool 14.

In the area between the two sealing lips 22, 24, there are vacuum channels which are connected to a vacuum pump (not shown) and which open by means of a channel-shaped widening 32 at the surface 28 of the lower tool 14. There can also be additional vacuum channels 34 which likewise open in the manner of a channel at the surface 28 in the area of the lower tool 14 at an area that lies farther to the inside with respect to the seal arrangement 18.

The vacuum channels 30 are used, after inserting the outer skin 16 into the tool 10, to produce a negative pressure in the area of the seal arrangement 18 and especially between the two sealing lips 22, 24 in the area between the outer skin 16 and the lower tool 14 in order to cause sealing contact of the outer skin 16 with the sealing lips 22, 24. The vacuum channels 34 are also used to produce a negative pressure in the area which lies farther to the inside with respect to the seal arrangement between the outer skin 16 and the surface 28 of the lower tool 14.

In the next step, a plastic material 36 is applied to the side of the outer skin 16 which faces away from the lower tool 14 (i.e., to the inside of the outer skin 16). If the plastic material 36 is applied in solely liquid form, the tool 10 is closed beforehand. The upper tool 12 provides for shaping of the side of the plastic material 36 which faces away from the outer skin 16. The outer skin 16 is pressed from the back, injected from the back or coated from the back. Preferably, the plastic material 36 has polyurethane as the main or sole component. Preferably, the plastic material 36 is introduced into the tool 10 by means of the so-called long fiber injection process (LFI process). Alternatively, the plastic material 36 can be introduced into the tool as a PHC (paper honey comb structure) which is a composite structure of a paper honeycomb structure and a glass fiber mat impregnated with polyurethane. Optionally, the polyurethane can be applied by means of an LFI process (long fiber injection) as a mixture of polyurethane and cut long glass fibers.

The lower tool 14 and the outer skin 16 are formed such that the plastic material 36 extends at least in part beyond the edge 26 of the outer skin 16 and in this area undergoes shaping by the surface 28 of the lower tool. In doing so, the surface 28 of the lower tool 14 is shaped such that the outer side of the plastic material 36 in the area which extends beyond the edge 26 of the outer skin 16 is flush with the outer side of the outer skin.

To avoid as much as possible migration behind the outer side of the outer skin 16 from the edge 26, the seal arrangement 18, especially the outer sealing lip 22, extends as near as possible to the edge 26. Possible projection of the edge 26 over the outer sealing lip 22 arises due to production tolerances in the process of shaping the outer skin.

After completion of shaping of the plastic material 36 by the upper tool 12 and the lower tool 14, i.e., after sufficient setting of the plastic material 36, the tool 10 is opened and the finished composite component can be removed from the tool. It goes without saying that, for this purpose, the negative pressure produced by the vacuum channels 30, 34 is adequately reduced beforehand or completely eliminated. To support removal of the composite component from the surface 28 of the lower tool 14, the vacuum channels 30, 34 can also be used to temporarily build up a positive pressure between the lower tool 14 and the outer skin 16.

Figure 3:
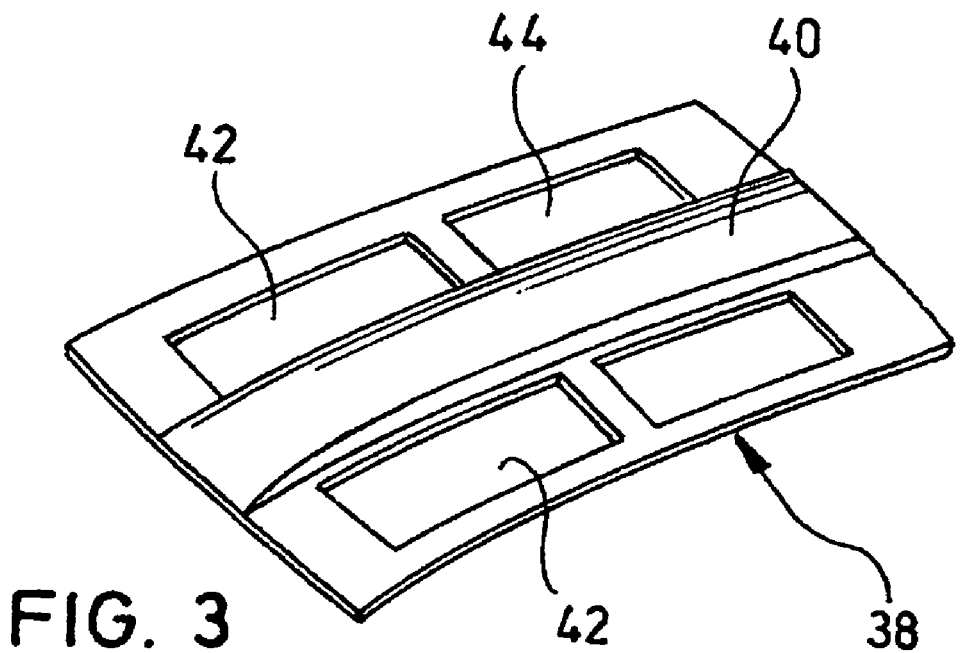
FIG. 3 is a perspective view of a roof module which has been produced using the process and tool of the invention after removal from the tool.
Figure 4:
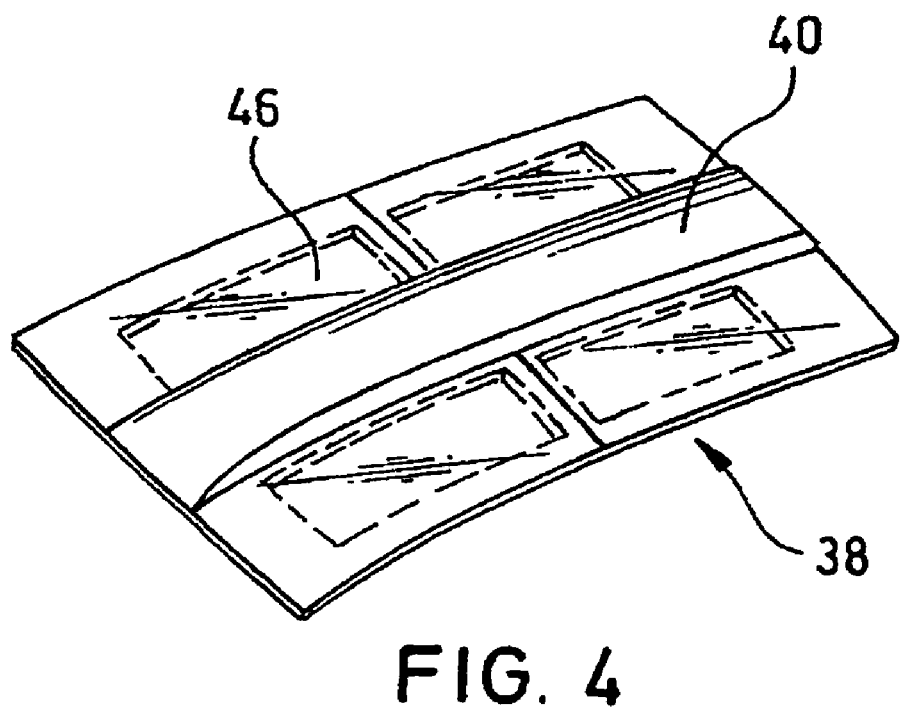
FIG. 4 is a view like FIG. 3, but with panes being mounted on the roof module to close the openings of the roof module.

FIGS. 3 & 4 show a roof module 38 as an example of a composite body part which can be produced as described above. Roof module 38 can be placed with its outside edges on the body frame of a vehicle and then permanently connected to it.

In the illustrated example, the outer side of the roof module 38 is provided with an outer skin 16 only in the area of a raised center console 40, while on the side edge areas 42, the outer side (which faces upward in FIGS. 3 & 4) is formed by the surface of the plastic material 36. In the side edge areas 42, there are a total of four roof openings 44 which, when the roof module is completely installed as shown in FIG. 4, are closed by transparent glass panes which are placed on the outer side and are attached thereto.

Because the seal arrangement 18 is designed to adjoin the peripheral edge area 20 of the outer skin 16, part of the plastic material 36 can be prevented from reaching the outer side of the outer skin 16, although the plastic material 36 extends over the edge area 26 of the outer skin 16. In this way, a composite body part can be formed which is only partially covered by the outer skin 16. Because the plastic material 36 can extend beyond the edge 26 of the outer skin 16, in the area of the lower tool 14, there is enough space to equalize the production tolerances of the outer skin 16 and the different coefficients of thermal expansion in the area adjoining the edge 26.

What is claimed is:

1. Process for producing a composite body part for a motor vehicle in a tool which comprises a first tool part and a second tool part which are movable relative to one another and which together form a mold cavity, comprising the steps of:

inserting an outer skin into the first tool part with a peripheral edge of the outer skin spaced inward of a peripheral edge portion of the mold cavity defined by the first tool part, and placing at least part of a peripheral edge area of a side of the outer skin facing the first tool part that is located inward of said peripheral edge into sealing contact with a seal arrangement comprising a pair of seals formed of a permanently elastic material which is provided in the first tool part, producing a negative pressure between the first tool part and the outer skin in the area between the pair of seals of the seal arrangement so as to produce said sealing contact of the outer skin with the seal arrangement, applying a plastic material to a side of the outer skin which faces away from the first tool part and extending within the mold cavity beyond and around said peripheral edge, shaping the plastic material by applying pressure by means of the second tool part, and releasing the composite body part produced from the seal arrangement by applying positive pressure between the pair of seals and removing it from the tool.

2. Process as claimed in claim 1, wherein the first tool part is shaped such that the surface of the plastic material in the area in which the plastic material extends beyond the peripheral edge of the outer skin is flush with the surface of the outer skin.

3. Process as claimed in claim 1, wherein the plastic material is introduced into the tool by means of a long fiber injection process.

4. Process as claimed in claim 1, wherein the plastic material is introduced into the tool as a plastic-reinforced honeycomb structure.

5. Process as claimed in claim 4, wherein the honeycomb structure is a paper honeycomb structure with a glass fiber mat impregnated with a polyurethane.

6. Process as claimed in claim 5, wherein the polyurethane is applied by means of a long fiber injection process.

7. Process as claimed in claim 1, wherein the negative pressure is produced only in the area between the outer skin and the first tool part which lies between the two sealing lips.

8. Process as claimed in claim 1, wherein a negative pressure is also produced between the outer skin and the first tool part in an area which lies farther to the inside with respect to the seal arrangement.

9. Process as claimed in claim 1, wherein the seal arrangement extends as far as the peripheral edge of the outer skin.

10. Process as claimed in claim 1, wherein the outer skin is preformed before insertion into the first tool part.

11. Process as claimed in claim 1, wherein the plastic material contains polyurethane.

12. Process as claimed in claim 1, wherein, for removal of the composite body part from the tool, positive pressure is produced between the first tool part and the outer skin also in an area which lies to the inside with respect to the seal arrangement.

13. Process as claimed in claim 1, wherein the first tool part lies at the bottom and the second tool part lies at the top relative to the outer skin.

14. Process as claimed in claim 1, wherein the outer skin comprises a one of a plastic film, an aluminum sheet and a steel sheet.

* * * * *